United States Patent Office 3,475,274
Patented Oct. 28, 1969

3,475,274
PRODUCTION OF RIBOFLAVIN
Roger L. Harned, Terre Haute, Ind., assignor to Commercial Solvents Corporation, New York, N.Y., a corporation of Maryland
No Drawing. Filed Aug. 7, 1967, Ser. No. 658,597
Int. Cl. C12d *5/04*
U.S. Cl. 195—28          5 Claims

ABSTRACT OF THE DISCLOSURE

A process for the production of riboflavin by the cultivation of the organism *Eremothecium ashbyii* on a fermentation medium in the presence of fat and glycerol.

SUMMARY OF THE INVENTION

This invention relates to a process for the production of riboflavin. In a particular aspect, it relates to the production of riboflavin by the cultivation of the organism *Eremothecium ashbyii* on a fermentation medium in the presence of fat and glycerol.

The use of the organism *Eremothecium ashbyii* for the production of riboflavin by fermentation has long been known in the art. A variety of media have been suggested by various investigators for the production of riboflavin by the cultivation of this organism. Previously, saccharides, fats and protein sources have been widely used as components of the fermentation medium to supply assimilable carbon and nitrogen. For example, Stiles in, U.S. Patent 2,483,853 described the production of riboflavin by deep-tank fermentation employing a variety of carbohydrate, protein, and lipid sources, and Rudert in U.S. Patent 2,374,503 described a medium wherein the carbohydrate source was replaced by lipids, such as corn oil, olive oil, peanut oil and the like, and having from 10 to 90% of a proteinaceous material based on the total nutrients in the medium. In U.S. Patent 2,605,210, Hickey described a medium containing as essential ingredients casein and sodium oleate in addition to the usual carbohydrates, mineral salts, etc. Hickey also disclosed that numerous lipids could be used with his medium when combined with the necessary amounts of proteins.

Although these processes have been satisfactory, the yields obtained have not been as high as desirable. Thus, Stiles and Rudert obtained yields of 100–300 mg./l and Hickey obtained yields of about 1400 mg./l.

It is an object of this invention to provide a new process for the production of riboflavin.

It is another object of this invention to provide a nutrient fermentation medium for the production of riboflavin by cultivation of the organism *Eremothecium ashbyii*.

Other objects of this invention will be obvious to those skilled in the art from the description herein.

A process has been discovered for the production of riboflavin by the cultivation of the organism *Eremothecium ashbyii* on a nutrient fermentation medium wherein the carbohydrates previously employed to supply assimilable carbon are replaced in whole or in part by vegetable or animal fats in combination with glycerol. In addition to the glycerol content, the new medium may contain some carbohydrate from a saccharide source. Other components of the new medium include one or more sources of nitrogen and known essential minerals including sources of phosphorous and potassium. The fermentation is conducted for about 5 to 6 days according to known methods and conditions of agitation and aeration at a temperature of from about 25° C. to 35° C. and a pH of about 6–8. When the fermentation is complete, the riboflavin is recovered by any suitable means, many of which are known, or preferably the entire fermentation medium is dried, e.g. by spray drying or drum drying, to produce a product containing riboflavin in the dried solids, suitable for use as an animal feed supplement.

Some of the ingredients of the new medium have been employed by previous inventors, but it is the discovery of this invention to provide these ingredients in a new combination and in new proportions whereby surprisingly high yileds of riboflavin are obtained. For example, Rudert, U.S. Patent 2,374,503 disclosed the use of fats which would inherently provide some esters of glycerol, but the high yields obtainable by the addition of free glycerol in combination with the fat have not been heretofore known.

DETAILED DESCRIPTION

The composition of the preferred medium of this invention is set forth in the following table. The volumes given are at ambient temperatures, i.e. from 20 to 35° C. Considerable variation in the amounts given is permissible within the concept of this invention.

| Ingredient | Amount | Range |
|---|---|---|
| Soybean oil, ml | 2 | 1–4 |
| Glycerol, ml | 2 | 1–4 |
| Carbohydrate, g | 0 | 0–3 |
| Corn steep liquor, ml | 1.2 | 1–2 |
| Casein, g | 1.2 | 0.8–2 |
| KH$_2$PO$_4$, g | 0.1 | 0.08–0.12 |
| pH | 7.0–7.2 | 6–8 |
| Water (ml.), q.s. to | 100 | 90–120 |

One feature of the new medium is that the assimilable carbon source is supplied by animal or vegetable fats and glycerol. These carbon sources can be used when desired, in combination with a saccharide source, including glucose, sucrose, maltose, corn-sugar molasses or high-test molasses. Technical grade glucose (corn-sugar) is ap referred saccharide source in a concentration of up to 3.0 g./100 ml., preferably up to 2.0 g./100 ml.

Suitable fats include naturally-occurring glycerides, e.g. vegetable and animal fats and oils, such as soybean oil, corn oil, peanut oil, linseed oil, mustard oil, fish oils, lard oil and similar materials, many of which are known. These natural oils contain mixed glycerides of fatty acids, including both saturated and unsaturated fatty acids. Lard oil and soybean oil are preferred fats for the practice of this invention.

The glycerol used in the practice of this invention can be crude or refined glycerol obtained by synthetic processes or by the hydrolysis of fats and oils. Preferably, the glycerol is technical grade but free from deleterious contaminants which would otherwise be carried on to the end product of the process of this invention.

The corn steep liquor used in the practice of this invention a well-known residue product from the wet milling of starch and is available from corn starch manufacturers. It is a known source of vitamins, minerals and growth factors, including biotin, which are beneficial for the growth of *E. ashbyii*.

The potassium acid phosphate used in the practice of this invention is the grade normally used in fermentation processes.

The casein is employed primarily to supply the nitrogen requirements for the organism and the riboflavin synthesis. Ordinary commercial grade casein is suitable for the practice of this invention. The ammonium ion, when present, can also be utilized to some extent as a nitrogen source.

Generally, the fermentation process utilizing the medium of this invention is carried out in accordance with known processes, e.g. Tabenkin, U.S. Patent 2,493,274. The medium is prepared as set forth above. The pH is adjusted to within 5.5 to 8.0, preferably 7.0–7.2, with ammonium hydroxide. It is then sterilized according to known procedures, e.g. by heating under pressure at about 235° F. for about 20 minutes, cooled and inoculated with an active culture of *Eremothecium ashbyii*.

The fermentation is conducted in a suitable vessel equipped with agitation and aeration equipment, e.g. in vessels aerated by introducing air into the medium through a sparger tube or other suitable means. A high aeration rate is preferred. The fermentation is conducted until riboflavin production has reached a maximum, as can be determined by periodic assay by known methods; generally, the fermentation is complete in about 5–6 days. The temperature is maintained at 25–35° C., preferably 28–30°.

When the fermentation is complete, the riboflavin can be recovered by any suitable procedure, many of which are known, such as by precipitating and recrystallizing pure riboflavin, or by drying the entire fermented medium, including the riboflavin, for use as an animal feed supplement.

The following examples will further illustrate the practice of this invention, but it is not intended that the invention be limited thereby.

Two experimental fermentation media were used in the examples. They had the following composition (the sucrose was provided by high-test molasses):

| Ingredient | Basal Media 10 | 11 |
| --- | --- | --- |
| Casein, g | 10 | 10–12 |
| Corn steep liquor, ml | 12 | 12 |
| KH$_2$PO$_4$, g | 1.0 | 1.0 |
| Sucrose, g | 20 | |
| Tap water (liter), q.s. to | 1.0–1.2 | 1.0–1.2 |
| Final pH | 6.9–7.2 | 6.9–7.2 |

In the preparation of the medium, the casein was first suspended in a small amount of water and heated, then ammonium hydroxide was gradually added until the casein dissolved. The potassium acid phosphate was mixed with the steep liquor and the pH was adjusted to 6.7 with ammonium hydroxide, then mixed with the casein and the remaining ingredients.

Example 1

A 100 ml. portion of basal medium 11 was placed in each of a series of wide-mouth Erlenmeyer flasks of 500 ml. capacity. Lard oil in 2, 4 and 6 ml. increments was added to flasks 1–3, and similarly glycerol was added to flasks 4–6. In flasks 7 and 8 both lard oil and glycerol were added. The flasks were closed with 2 milk filter discs (Montgomery Ward and Company), and flasks and contents were sterilized by heating under pressure in an autoclave for 20 minutes at a temperature of about 110° C. After cooling to room temperature, the flasks were inoculated with an 18–24 hour seed culture of *Eremothecium ashbyii*. The seed culture was grown on the following medium:

| | |
| --- | --- |
| Milk solids, g./100 ml. | 2 |
| Glucose, g./100 ml. | 1.5 |
| Corn steep liquor, ml. | 1.0 |
| Lard oil | 1.0 |
| Tap water, q.s. to make, ml. | 100 |
| pH, adjust with Na$_2$CO$_3$ to | 6.5–6.7 |

After inoculation, the flasks were incubated at a temperature of 30° C. Aeration and agitation were provided by shaking the flasks on a rotary action type shaker at 300 to 350 r.p.m. in the presence of air. The fermentation was terminated after six days and the following riboflavin yields were obtained:

| Flask | Lard Oil, ml. | Glycerol, ml. | Riboflavin Assay, mg./liter |
| --- | --- | --- | --- |
| 1 | 2 | | 1,310 |
| 2 | 4 | | 1,490 |
| 3 | 6 | | 970 |
| 4 | | 2 | 1,665 |
| 5 | | 4 | 1,505 |
| 6 | | 6 | 1,305 |
| 7 | 2 | 1 | 2,895 |
| 8 | 2 | 2 | 3,083 |

In the flasks containing both lard oil and glycerol an unexpectedly high yield of riboflavin was obtained.

Example 2

The experiment of Example 1 was repeated using the carbohydrate-free medium with varying ratios of oil to glycerol. For comparison, a commercial medium with 2 ml. of lard oil added was used in flask 2–4.

| Flask | Lard Oil, ml. | Glycerol, ml. | Riboflavin Assay, mg./liter |
| --- | --- | --- | --- |
| 2–1 | 2 | 1 | 2,500 |
| 2–2 | 2 | 2 | 3,500 |
| 2–3 | 2 | 4 | 5,050 |
| 2–4 | 2 | | 2,590 |
| 2–5 | 4 | | 1,440 |
| 2–6 | 4 | 1 | 4,385 |
| 2–7 | 4 | 2 | 4,285 |
| 2–8 | 4 | 4 | 5,290 |
| 2–9 | 4 | 6 | 4,230 |

From these results it is apparent that the oil:glycerol ratio can vary from 2:1 to 1:2 and the oil content can vary from 2 to 4 parts per 100 by volume.

Example 3

The experiment of Example 2 was repeated except that soybean oil was substituted for lard oil.

| Flask | Soybean Oil, ml. | Glycerol, ml. | Riboflavin Assay, mg./liter |
| --- | --- | --- | --- |
| 3–1 | 2 | | 1,220 |
| 3–2 | 2 | 1 | 3,210 |
| 3–3 | 2 | 2 | 4,465 |
| 3–4 | 4 | | 2,640 |
| 3–5 | 4 | 4 | 5,400 |
| 2–4 | Commercial medium with 2 ml. of lard oil | | 2,590 |

From these results it is apparent that vegetable oil is preferable to animal oil, though only to a minor degree.

Example 4

The experiment of Example 1 was repeated except that basal medium 10 containing carbohydrate was substituted for medium 11, varying amount of casein were added, and soybean oil was substituted for lard oil.

| Flask | Soybean Oil (ml.) | Glycerol, ml. | Total Casein, g./100 ml. | Riboflavin Assay, mg./liter |
| --- | --- | --- | --- | --- |
| 4–1 | 2 | 2 | 1.0 | 3,621 |
| 4–2 | 2 | 2 | 1.2 | 4,115 |
| 4–3 | 2 | 2 | 1.4 | 3,905 |
| 4–4 | 2 | 2 | 1.6 | 3,592 |
| 4–5 | 2 | 2 | 1.8 | 2,887 |
| 4–6 | 4 | 4 | 1.0 | 2,376 |
| 4–7 | 4 | 4 | 1.2 | 2,589 |
| 4–8 | 4 | 4 | 1.4 | 2,661 |
| 4–9 | 4 | 4 | 1.6 | 2,675 |
| 4–10 | 4 | 4 | 1.8 | 3,089 |

From the above results it is apparent that in the presence of carbohydrate the oil and glycerol are effective at concentrations of about 2–4 parts per 100 parts by volume and casein at a concentration of 1–2 g./100 ml. is useful.

Example 5

The experiment of Example 4 was repeated with basal medium 10 formulated without carbohydrate and varying amounts of high-test molasses (70% sugar) were added at two concentrations of oil and glycerol.

| Flask | Soybean Oil, (ml.) | Glycerol, ml. | Total Casein, g./100 ml. | Riboflavin Assay, mg./liter |
|---|---|---|---|---|
| 5-1 | 1 | 1 | 1.1 | 2,891 |
| 5-2 | 1 | 1 | 1.1 | 3,812 |
| 5-3 | 1 | 1 | 2.2 | 3,620 |
| 5-4 | 1 | 1 | 3.3 | 2,633 |
| 5-5 | 1 | 1 | 4.4 | 2,115 |
| 5-6 | 2 | 2 | 0 | 3,585 |
| 5-7 | 2 | 2 | 1.1 | 2,539 |
| 5-8 | 2 | 2 | 2.2 | 2,363 |
| 5-9 | 2 | 2 | 3.3 | 2,155 |
| 5-10 | 2 | 2 | 4.4 | 1,437 |

It is apparent that at a concentration of 1 part glycerol–1 part oil per 100 parts by volume of medium the presence of 1.1 to 2.2 g./100 ml. of molasses supplying 0.75 to 1.5 g./100 mil. of sucrose as a carbohydrate source is beneficial. However, at higher concentrations of oil and glycerol the addition of sucrose is undesirable.

Example 6

The experiment of Example 3 is repeated except that corn oil is substituted for soybean oil. A high yield of riboflavin is obtained.

I claim:

1. In a process for the production of riboflavin by culturing *Eremothecium ashbyii* on a nutrient fermentation medium containing sources of assimilable carbon, assimilable nitrogen, essential minerals and growth factors, the improvement comprising using a fermentation medium wherein the said assimilable carbon source is substantially supplied by glycerol and a member selected from the group consisting of animal fat and vegetable fat wherein the fat to glycerol is in a ratio of from about 2:1 to 1:2 parts by volume and at a concentration of from about 2 to about 4 parts each by volume of said fermentation medium.

2. The fermentation process of claim 1 wherein the fat-glycerol combination is present in a ratio of about 1:1 parts by volume per 100 volumes of medium and the medium additionally contains a carbohydrate source at a concentration of from about 0.75 g. to about 1.5 g./100 ml. of medium.

3. The fermentation process of claim 1 wherein the animal fat is lard oil.

4. The fermentation process of claim 1 wherein the vegetable fat is soybean oil.

5. The fermentation process of claim 1 wherein the vegetable fat is corn oil.

References Cited

UNITED STATES PATENTS

| 2,374,503 | 4/1945 | Rudert | 195—28 |
| 2,400,710 | 5/1946 | Piersma | 195—28 |
| 2,473,818 | 6/1949 | Phelps | 195—82 |

FOREIGN PATENTS 593,027  10/1947  Great Britain.

ALVIN E. TANENHOLTZ, Primary Examiner

U.S. Cl. X.R.

195—35, 100

UNITED STATES PATENT OFFICE
CERTIFICATE OF CORRECTION

Patent No. 3,475,274           Dated October 28, 1969

Inventor(s) Roger L. Harned

It is certified that error appears in the above-identified patent and that said Letters Patent are hereby corrected as shown below:

In column 2, line 8, delete "yileds" and substitute therefor --yields--; in line 37, delete "ap referred" and substitute therefor --a preferred--; in line 54, insert --is-- after "invention"; in line 71, delete "-274" and substitute therefor --274--.

In column 5, line 4, in the heading of the fourth column, delete "Casein" and substitute therefor --Molasses--; in line 6, in the fourth column, delete "1.1" and substitute therefor --0--; in line 17, delete "mil" and substitute therefor --ml--.

SIGNED AND SEALED

JUN 9 1970

(SEAL)
Attest:

Edward M. Fletcher, Jr.
Attesting Officer

WILLIAM E. SCHUYLER, JR.
Commissioner of Patents